US 8,762,862 B2

(12) United States Patent
Singh et al.

(10) Patent No.: US 8,762,862 B2
(45) Date of Patent: Jun. 24, 2014

(54) INITIATING A SUPPORT CHAT SESSION IN RESPONSE TO THE OCCURRENCE OF A SUPPORT EVENT WITH TRANSMISSION OF DETAILED EVENT INFORMATION

(75) Inventors: Ram Pratap Singh, Sammamish, WA (US); Jon D. Pulsipher, North Bend, WA (US); Philip J. Lafornara, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 12/134,178

(22) Filed: Jun. 5, 2008

(65) Prior Publication Data
US 2009/0307612 A1    Dec. 10, 2009

(51) Int. Cl.
*G06F 3/00* (2006.01)

(52) U.S. Cl.
USPC ............ 715/758; 715/753; 715/756; 709/204

(58) Field of Classification Search
USPC ..................................... 715/758, 748; 714/57
See application file for complete search history.

(56) References Cited

U.S. PATENT DOCUMENTS

| | | | |
|---|---|---|---|
| 5,790,780 A * | 8/1998 | Brichta et al. .................. 714/46 |
| 5,983,369 A | 11/1999 | Bakoglu et al. |
| 5,999,908 A * | 12/1999 | Abelow ....................... 705/7.32 |
| 6,230,287 B1 | 5/2001 | Pinard et al. |
| 6,560,726 B1 | 5/2003 | Vrhel et al. |
| 6,772,376 B1 | 8/2004 | Merkin et al. |
| 6,848,997 B1 * | 2/2005 | Hashimoto et al. ............. 463/42 |
| 6,871,322 B2 * | 3/2005 | Gusler et al. .................. 715/708 |
| 6,973,620 B2 | 12/2005 | Gusler et al. |
| 6,999,990 B1 | 2/2006 | Sullivan et al. |
| 7,058,860 B2 | 6/2006 | Miller et al. |
| 7,240,110 B2 * | 7/2007 | Haitsuka et al. .............. 709/224 |
| 7,269,793 B2 * | 9/2007 | Horsfall et al. ............... 715/751 |
| 7,290,181 B2 | 10/2007 | D'Angelo et al. |
| 7,451,186 B2 * | 11/2008 | Morinigo et al. ............. 709/206 |
| 7,466,986 B2 * | 12/2008 | Halcrow et al. ............ 455/456.2 |
| 7,516,409 B2 * | 4/2009 | Zaner et al. ................... 715/751 |
| 7,747,685 B2 * | 6/2010 | Chen et al. .................... 709/204 |
| 7,831,635 B2 * | 11/2010 | Brothers et al. .............. 707/803 |
| 7,895,330 B2 * | 2/2011 | Evanchik et al. ............. 709/226 |

(Continued)

FOREIGN PATENT DOCUMENTS

WO    WO0127847 A1    4/2001

OTHER PUBLICATIONS

"Computer Technical Support, Open 24-Hours", 2007, Computer Help by Tech24, p. 1.

(Continued)

*Primary Examiner* — William Titcomb
(74) *Attorney, Agent, or Firm* — Louise Bowman; Jim Ross; Micky Minhas

(57) ABSTRACT

Technologies are described herein for launching an online support chat session in response to an occurrence of a support event on a personal computer and transmitting detailed event information via the chat session for display to support personnel. When an error or other event occurs on a computer, an online support chat session is established using an online support chat client associated with the error or event. The pertinent information about the error or event along with additional data regarding the computer and the user are transmitted via the online support chat session for display to the support personnel.

13 Claims, 7 Drawing Sheets

(56) References Cited

U.S. PATENT DOCUMENTS

| | | | |
|---|---|---|---|
| 2003/0061279 A1* | 3/2003 | Llewellyn et al. | 709/203 |
| 2003/0208543 A1* | 11/2003 | Enete et al. | 709/206 |
| 2004/0213384 A1* | 10/2004 | Alles et al. | 379/70 |
| 2005/0034079 A1* | 2/2005 | Gunasekar et al. | 715/753 |
| 2005/0278630 A1* | 12/2005 | Bracey | 715/704 |
| 2006/0036692 A1* | 2/2006 | Morinigo et al. | 709/206 |
| 2006/0075104 A1* | 4/2006 | Kumer | 709/227 |
| 2007/0032225 A1* | 2/2007 | Konicek et al. | 455/417 |
| 2007/0038499 A1* | 2/2007 | Margulies et al. | 705/9 |
| 2008/0051064 A1* | 2/2008 | Jones et al. | 455/412.2 |
| 2009/0063175 A1* | 3/2009 | Hibbets et al. | 705/1 |
| 2009/0063386 A1* | 3/2009 | Hibbets | 706/50 |
| 2009/0119606 A1* | 5/2009 | Gilbert | 715/758 |

OTHER PUBLICATIONS

"SupportCenter: A Solution for Online Technical Support", 2007, InterCall is a subsidiary of West Corporation, p. 1.

"Computer Support at Geeks by Minute", downloaded Dec. 27, 2007 from http://www.geeksbyminutes.com, 4 Pages.

* cited by examiner

INITIATING A SUPPORT CHAT SESSION IN RESPONSE TO THE OCCURRENCE OF A SUPPORT EVENT WITH TRANSMISSION OF DETAILED EVENT INFORMATION

BACKGROUND

When a user experiences an error or other condition on their personal computer for which they need support from a computer technician, the user must determine the organization that will provide support for the particular error or condition, and how to contact that organization. Often it is difficult for a layperson to determine what the source of the error is: the computer hardware, the operating system, or the software application they were running at the time the error occurred. In the case of most personal computers, support may be provided by the manufacturer of the computer hardware, the provider of the operating system, or the supplier of the application software installed on the computer.

Many computer retailers now offer a broad range of support for the computers they sell, including hardware and software support and service. Such support is often sold as an add-on contract to the purchase of the computer. In addition, several third-party pay-for-support organizations are available that will provide support for hardware and software issues. Many of these support organizations provide support via an online, web-based chat facility that allows the user to communicate directly with a technician or other support personnel at the organization in real-time, 24-hours a day.

However, even in this scenario, the user must be able to relate to the support personnel all of the relevant information required to understand and diagnose the error or condition. This may include cryptic error messages or codes that were displayed to the user, as well as technical details regarding the hardware and software configuration of the computer. A layperson may find it difficult to collect and relate this technical information to support personnel. Further, if the user has a support contract for the computer, the information required for support personnel to look up their account will have to be provided each time. After providing all of the relevant technical and user information, the user may often find that they must be transferred to another technician or support provider who has the required expertise in the specific problem to solve the issue.

It is with respect to these considerations and others that the disclosure made herein is presented.

SUMMARY

Technologies are described herein for launching an online support chat session in response to an occurrence of a support event on a personal computer and transmitting detailed event information via the chat session for display to support personnel. A support event is an error or condition that occurs on the personal computer and that has been associated with the establishment of an online support chat session with a support provider. Using the technologies provided, when a support event occurs on a computer, a user is provided the option to connect to support personnel who can provide support for the error or condition via an online chat session.

In addition, once the chat session is established, the pertinent information about the error or condition along with background information regarding the computer hardware and software configuration, the user, and any support contract information are related to the support personnel via the online support chat session in an automated fashion. This ensures that the user is connected with the correct support personnel at the correct support provider when the error occurs, without the user having to determine the source of the error and the organization that is responsible for supporting it. This also ensures that the support personnel have the relevant information necessary to troubleshoot the user's problem, thereby allowing them to respond to the user with a solution without requiring a lengthy conversation regarding the technical details of the error or the configuration of the computer.

According to aspects presented herein, when a support event is detected on a computer, the user is prompted to establish an online support chat session in response to the event. If the user specifies that the chat session should be established, detailed information about the support event is received and additional data regarding the computer and the user is collected in order to add additional context to the event information. In one aspect, the additional data includes information identifying the hardware and software configuration of the computer, information identifying the user, and information identifying a support account for the user and the computer associated with the online support chat client.

The online support chat session is then established by executing an online support chat client associated with the support event. Once the chat session is established, the event information and the additional data regarding the computer and the user are transmitted over the online support chat session for display to support personnel. According to one aspect, the user is prompted for consent before transmitting the additional data over the chat session. In another aspect, a flag indicating the user has consented to the transmission of the additional data is also stored on the computer the first time consent is provided. By using the flag, the user will not be prompted again for consent prior to subsequent transmission of the additional data.

According to further aspects presented herein, the additional data regarding the computer and the user is collected and stored on the personal computer when the online support chat client and other supporting components are installed. The additional data can then be retrieved from storage for transmission over the online support chat session, thus eliminating the need to collect the additional data before establishing each online support chat session. In another aspect, if the online support chat session cannot be established successfully, alternate support content associated with the support event is displayed to the user to aid the user in responding to the event.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
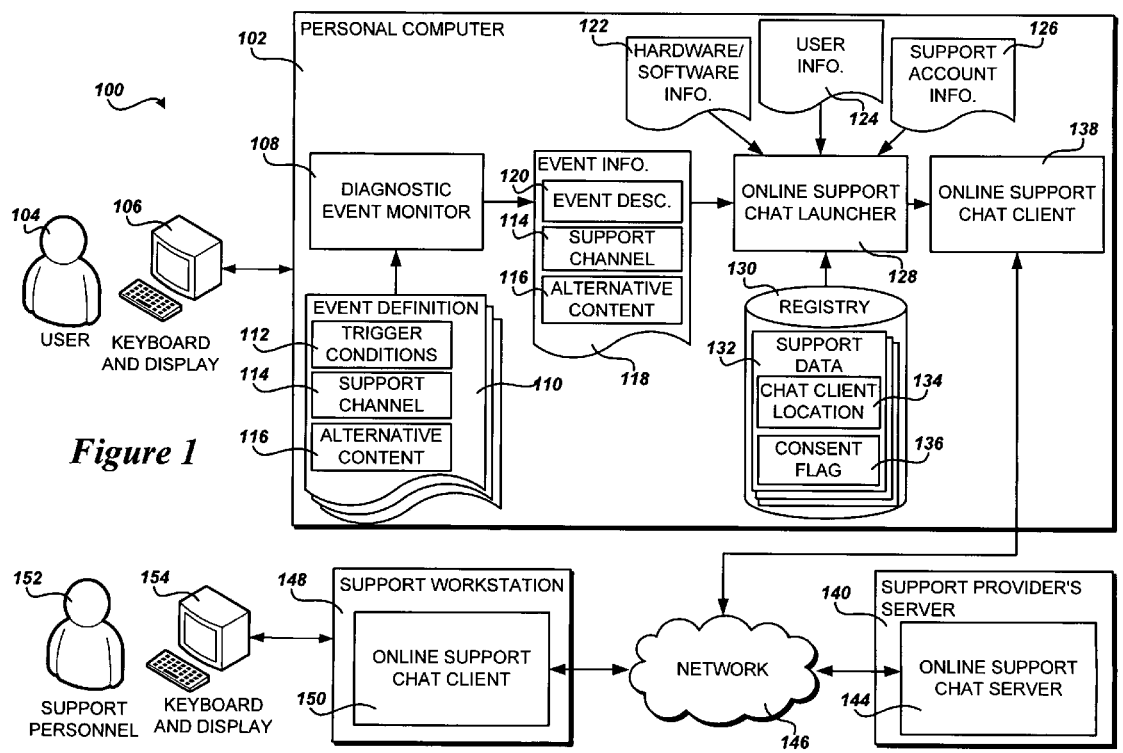
FIG. 1 is a block diagram showing aspects of an illustrative operating environment and several software components provided by the embodiments presented herein.

The following detailed description is directed to technologies for launching an online support chat session in response to an occurrence of a support event on a personal computer and transmitting detailed event information via the chat session for display to support personnel. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a methodology for launching an online support chat session in response to an occurrence of a support event on a personal computer and transmitting detailed event information via the chat session for display to support personnel will be presented.

Turning now to FIG. 1, details will be provided regarding an illustrative operating environment and several software components provided by the embodiments presented herein. FIG. 1 illustrates an exemplary system 100 for detecting the occurrence of a support event on a personal computer, establishing an online support chat session, and transmitting detailed information about the event via the online support chat session. The system 100 includes a personal computer 102 (PC) that is utilized by a user 104 through a display and keyboard 106 connected to the PC 102. It will be appreciated that the user 104 may access the PC 102 through any number of input and output devices, such as a computer monitor, printer, keyboard, mouse, trackball, mouse pad, stylus, or touch-screen that may be directly connected to the PC 102 or remotely connected via a network. It will be further appreciated that the PC 102 illustrated in FIG. 1 may represent any computing device with which a user 104 may interact, including a desktop computer, notebook, laptop, tablet computer, ultra-mobile PC, server, or handheld device.

A diagnostic event monitor 108 executes on the PC 102. The diagnostic event monitor 108 has the ability to monitor and detect various conditions and events occurring on the PC 102, including, but not limited to, hardware errors, system log entries, free disk space, network utilization, free memory, processor utilization, internal temperature of components, connection or disconnection of peripherals, wireless networking connections, and boot time or application startup-time. In one embodiment, the diagnostic event monitor 108 is the DIAGNOSTIC ENGINE from GTEKO LTD., a subsidiary of MICROSOFT CORP. of Redmond, Wash. It will be appreciated that many methods or technologies known in the art may be utilized to monitor the PC 102 and any number of events or conditions may be detected.

One or more online support chat clients 138 are also installed on the PC 102. The online support chat client 138 facilitates online chat sessions between the user 104 using the PC 102 and support personnel for a particular support provider. The online support chat client 138 also provides for the transmission of context information over the chat session for display to support personnel prior to displaying the chat user interface (UI), as will be described in more detail below.

In one embodiment, the online support chat client 138 connects to an online support chat server 144 executing on a support provider's server 140 via a network 146. This allows the user 104 to chat online with support personnel 152 utilizing a similar online support chat client 150 executing on a support workstation 148 operatively connected to the online support chat server 144. In an alternative embodiment, the online support chat client 138 located on the PC 102 connects directly to the online support chat client 150 on the support workstation 148. It will be appreciated that any of a number of online chat technologies known in the art may be utilized to provide establishment and support of the online support chat session, including, but not limited to, web-based chat applications, Internet Relay Chat (IRC), instant messaging technologies, or voice chat technologies, such as voice over IP (VOIP).

According to one embodiment, the network 146 comprises the Internet. However, it will appreciated that the network 146 may comprise a LAN, WAN, or other type of network suitable to allow the online support chat clients 138, 150 located on the PC 102 and the support workstation 148 to communicate with the online support chat server 144 and/or each other. It will be further appreciated that many more networks and network connections may be utilized than illustrated in FIG. 1.

In addition, an online support chat launcher 128 is installed on the PC 102. As will be further described below, the diagnostic event monitor 108 establishes an online support chat session by utilizing the online support chat launcher 128 to launch one of the online support chat clients 138 installed on the PC 102. The online support chat launcher 128 provides a layer of abstraction between the diagnostic event monitor 108 and the various online support chat clients 138. The online support chat launcher 128 also collects additional data regarding the PC 102 and the user 104 that will transmitted through the online support chat session for display to support personnel 152, once the session is established. According to one embodiment, the additional data includes hardware and software configuration information 122 for the PC 102, user information 124 identifying the user 104 of the PC 102, and support account information 126 detailing any support subscriptions or accounts that the user 104 may have for this PC 102 with the support provider.

According to embodiments presented herein, the diagnostic event monitor 108 is configured to look for specific conditions or events based a number of event definitions 110 configured for the PC 102. Each event definition 110 includes a set of trigger conditions 112 that specify the combination of conditions on the PC 102 that will trigger an event, as well as information on how the diagnostic event monitor 108 is expected to handle the event. For example, one event definition 110 may specify that upon a connection of the PC 102 to an unsecured wireless network, the diagnostic event monitor 108 should display information to the user 104 of the PC 102 that warns the user 104 of the inherent risks in transmitting unsecured information across such a network. In one embodiment, the individual event definitions are maintained in an extensible markup-language (XML) configuration file located on the PC 102. It will be appreciated, however, that the event definitions 110 may be stored in any manner that allows access by the diagnostic event monitor 108.

Some of the event definitions 110 configured for the PC 102 may identify support events. As discussed briefly above, a support event is an error or condition associated with the establishment of an online support chat session with a particular support provider. Support events may include hardware and software errors that occur on the PC 102 as well as other conditions for which the user may need technical support. The event definitions 110 identifying support events include a support channel 114 that designates both the target support provider with which to establish the online support chat session as well as an associated online support chat client 138 that will be utilized to establish the chat session. This allows online support chat sessions to be created with different support providers based upon the context of the event that occurs. In one embodiment, the event definition 110 also contains alternative content 116 that is displayed to the user 104 if an online support chat session cannot be established, as will be further described below in regard to FIG. 2C.

For example, an event definition 110 may exist that specifies that an online support chat session should be established with support personnel 152 at a support website provided by a printer manufacturer whenever a trigger condition 112 of a printer hardware error occurs. The event definition 110 specifies a support channel 114 targeting the support website and designating a particular online support chat client 138 that provides connectivity to that site. The event definition 110 may also specify alternative content 116 that provides troubleshooting tips for printer hardware errors that can be displayed to the user 104 if the online support chat session cannot be established. In a further example, an event definition 110 may specify that an online support chat session should be established the first time the available hard disk drive space on the PC 102 falls below some minimum threshold level. The event definition 110 may specify a support channel 114 that targets a computer retailer's support site via an online support chat client 138 that was installed by the retailer of the PC 102 before it was sold. In addition, the event definition 110 may specify alternative content 116 that consists of a link to a product page at the retailer's website featuring a larger hard disk drive.

When the trigger conditions 112 specified for an event definition 110 identifying a support event occur, the diagnostic event monitor 108 is configured to start an online support chat session with the target support provider utilizing the online support chat client 138 designated by the support channel 114. As will be further described below in regard to FIGS. 3A and 3B, the diagnostic event monitor 108 establishes the online support chat session by utilizing the online support chat launcher 128 to launch the associated online support chat client. The diagnostic event monitor 108 passes event information 118 to the online support chat launcher 128, which includes an event description 120 detailing the conditions that occurred to trigger the event as well as the support channel 114 and any alternative content 116 defined for the support event. In a further embodiment, the event information 118 also contains a screen capture of the current display 106 of the PC 102. This screen capture is passed to support personnel 152 along with the other event information 118, allowing the support personnel 152 to see the state of the display 106, including any error message displayed to the user 104, at the time the support event occurred.

In another embodiment, the online support chat launcher 128 is invoked directly by a UI element displayed on the display 106 of the PC 102. For instance, the UI element may be configured to pass event information 118 to the online support chat launcher 128, which will allow it to establish an online support chat session associated with the specified support channel 114. This allows a support provider to offer a means for the user 104 to establish an online support chat session with the support personnel 152 without having to wait for a support event to be triggered by the diagnostic event monitor 108.

According to one embodiment, the online support chat launcher 128 retrieves a file location 134 of the online support chat client 138 to be launched from a support data entry 132 associated with the support channel 114 maintained in the registry 130 of the PC 102. In another embodiment, the registry 130 also maintains a consent flag 136 within the support data entry 132 associated with the support channel 114. The consent flag 136 allows for consent by the user 104 for transmission of additional data 122, 124, 126 regarding the PC 102 and the user 104 to be persisted for that support channel 114, as will be described in detail below in regard to FIGS. 3A and 3B.

Figure 2A:
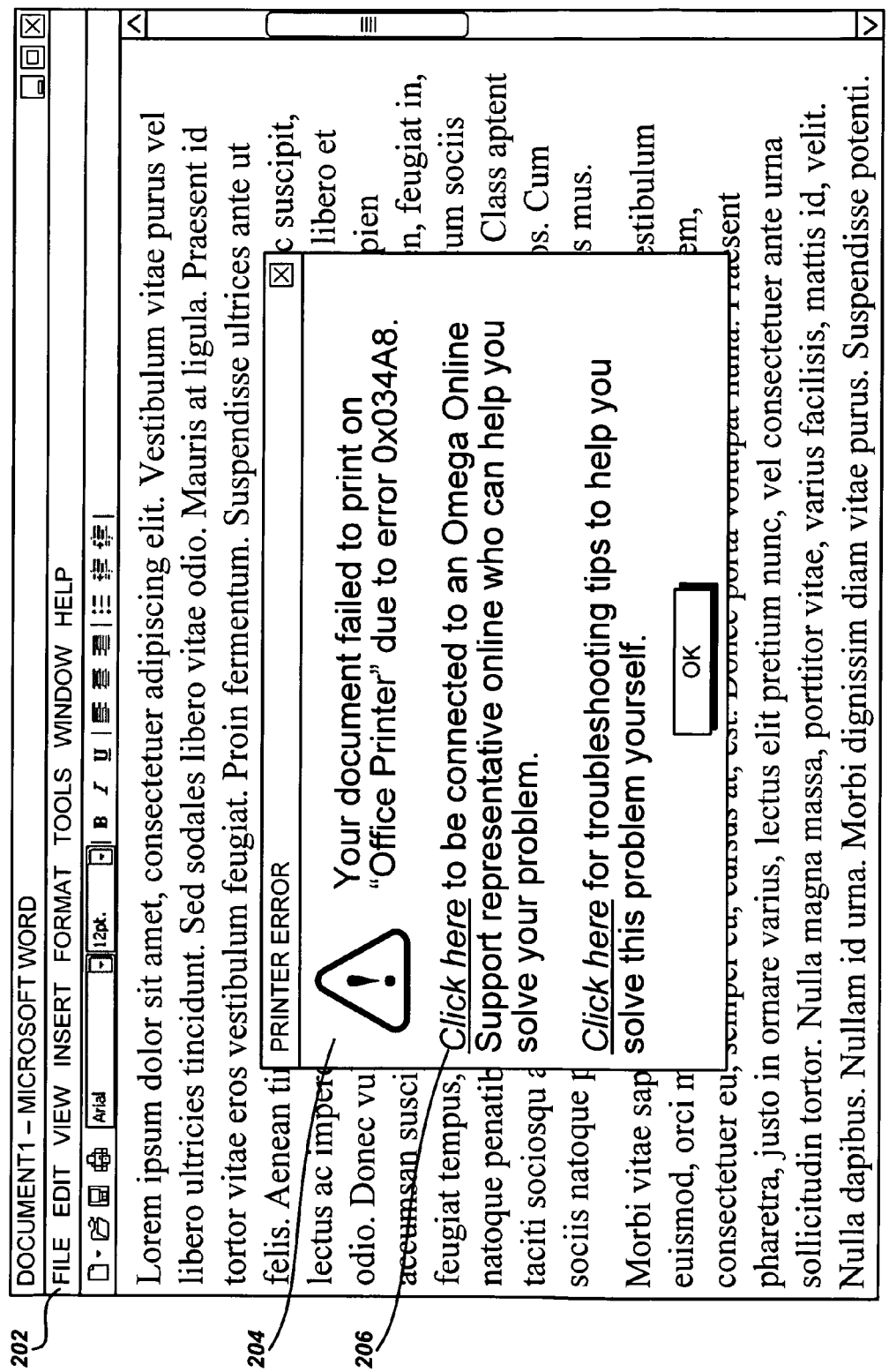
FIGS. 2A-2C are screen diagrams showing an illustrative user interface for displaying prompts and content to the user, according to embodiments described herein.
Figure 2B:
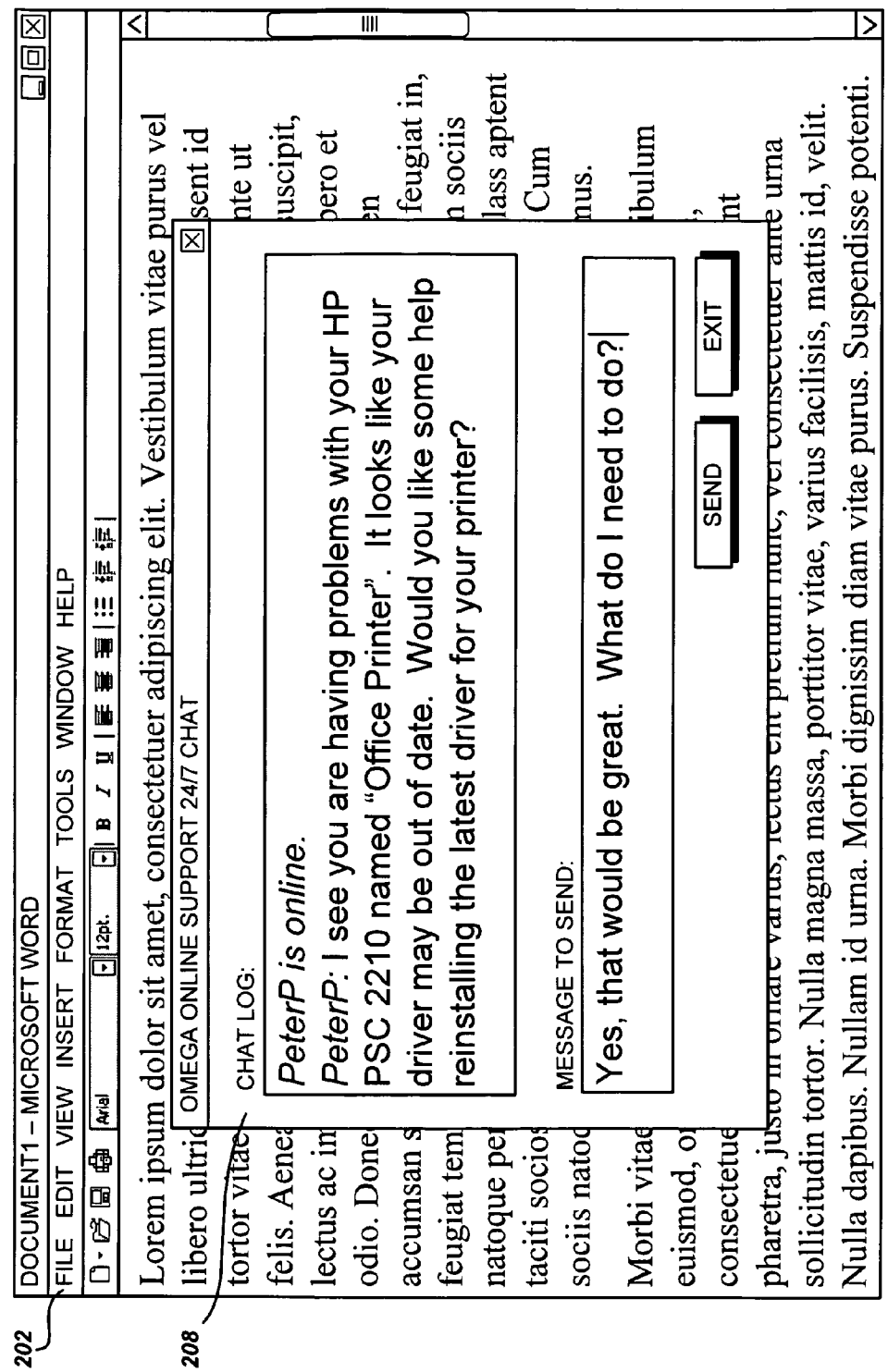
Figure 2C:
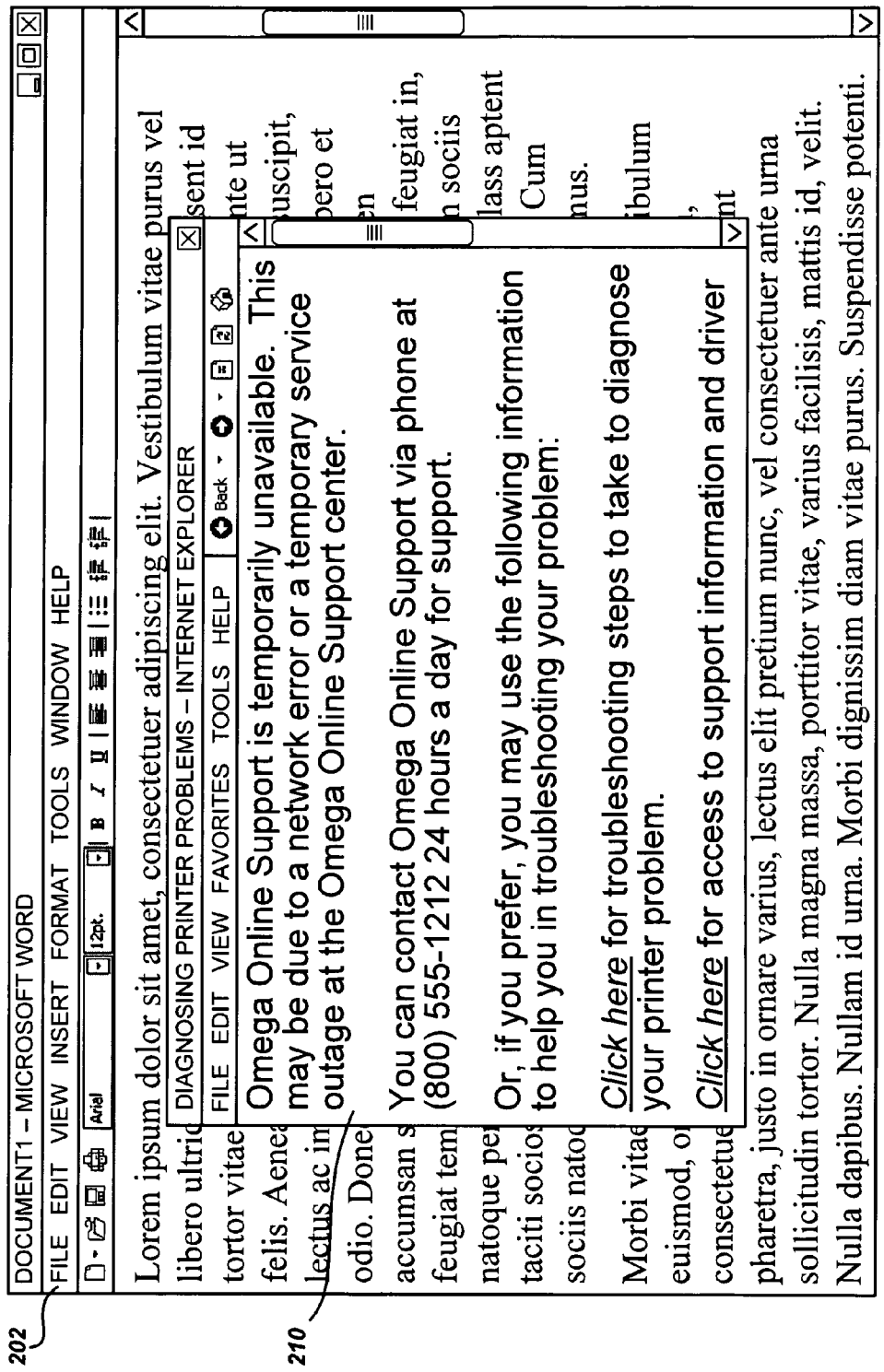

FIGS. 2A-2C are screen diagrams illustrating a UI utilized by the online support chat launcher 128 and/or the diagnostic event monitor 108 to communicate with the user once a support event is detected, according to embodiments. As will be discussed in further detail below in regard to FIGS. 3A and 3B, when a support event occurs on the PC 102, the user 104 is presented with a dialog box 204 on the display 106 attached to the PC 102. The dialog box 204 describes the event and presents the user 104 with an option 206 to establish and online support chat session in response to the event.

For example, as illustrated in FIG. 2A, if the diagnostic event monitor 108 detects an error when the user 104 attempts to print from a word processor application 202 executing on the PC 102, a dialog box 204 is displayed to the user that provides the details of the printer error. The dialog box 204 also presents an option 206 to the user to establish an online support chat session designated by the support channel 114 associated with printer error events in order to obtain immediate support in troubleshooting the error. In one embodiment, the option 206 is presented as a link in the text of the dialog box 204 that the user 104 may select using a mouse attached to the PC 102, as further illustrated in FIG. 2A. It should be appreciated that although the use of a mouse has been described in the examples presented herein, any suitable user input devices may be utilized. It will be further appreciated that any number of UI elements beyond those depicted in FIG. 2A may be displayed to the user 104 to inform the user of the event and to provide an option 206 to establish an online support chat session with a support provider.

If the user selects the option 206 to establish an online support chat session, then the online support chat launcher 128 will launch the online support chat client 138 to establish the chat session. Upon successfully establishing the online support chat session, the online support chat launcher 128 will immediately transmit the event information 118 and the additional data 122, 124, 126 to the support personnel 152 connected to the chat session. This will facilitate the support personnel 152 gaining a complete understanding of the support event that prompted the chat, before communicating with the user 104 via the online support chat client 138.

Once the event information 118 and the additional data 122, 124, 126 has been transmitted to support personnel, the online support chat client 138 will display a suitable chat UI 208 to the user 104, as illustrated in FIG. 2B. It will be appreciated that the appearance of the chat UI 208 will vary depending on the online support chat client 138 and underlying technology or protocol being utilized. Because the support personnel 152 have already been provided with detailed information regarding the event, the support personnel 152 may directly address the issue in their first communication with the user 104, as further illustrated in FIG. 2B.

According to one embodiment, if the online support chat launcher 128 fails to launch the online support chat client 138 or the online support chat session cannot be established for some reason, alternative content 116 provided to the online support chat launcher 128 in the event information 118 is displayed to the user. This allows the user to seek alternative means of support for the event or error. As illustrated in FIG. 2C, the alternative content 116 may consist of a local HTML file that will be shown in a browser window 210 by the online support chat launcher 128 and displayed to the user 104 when the online support chat session cannot be established. It will be appreciated that the alternative content 116 may be of any type commonly known in the art that can be displayed on the display 106 of the PC 102 by the online support chat launcher 128. This includes, but is not limited to, text displayed in a dialog window, a URL pointing to a remote document displayed in a browser window, mark-up language displayed in a proprietary reader window, or a help file displayed in a help window.

Figure 3A:
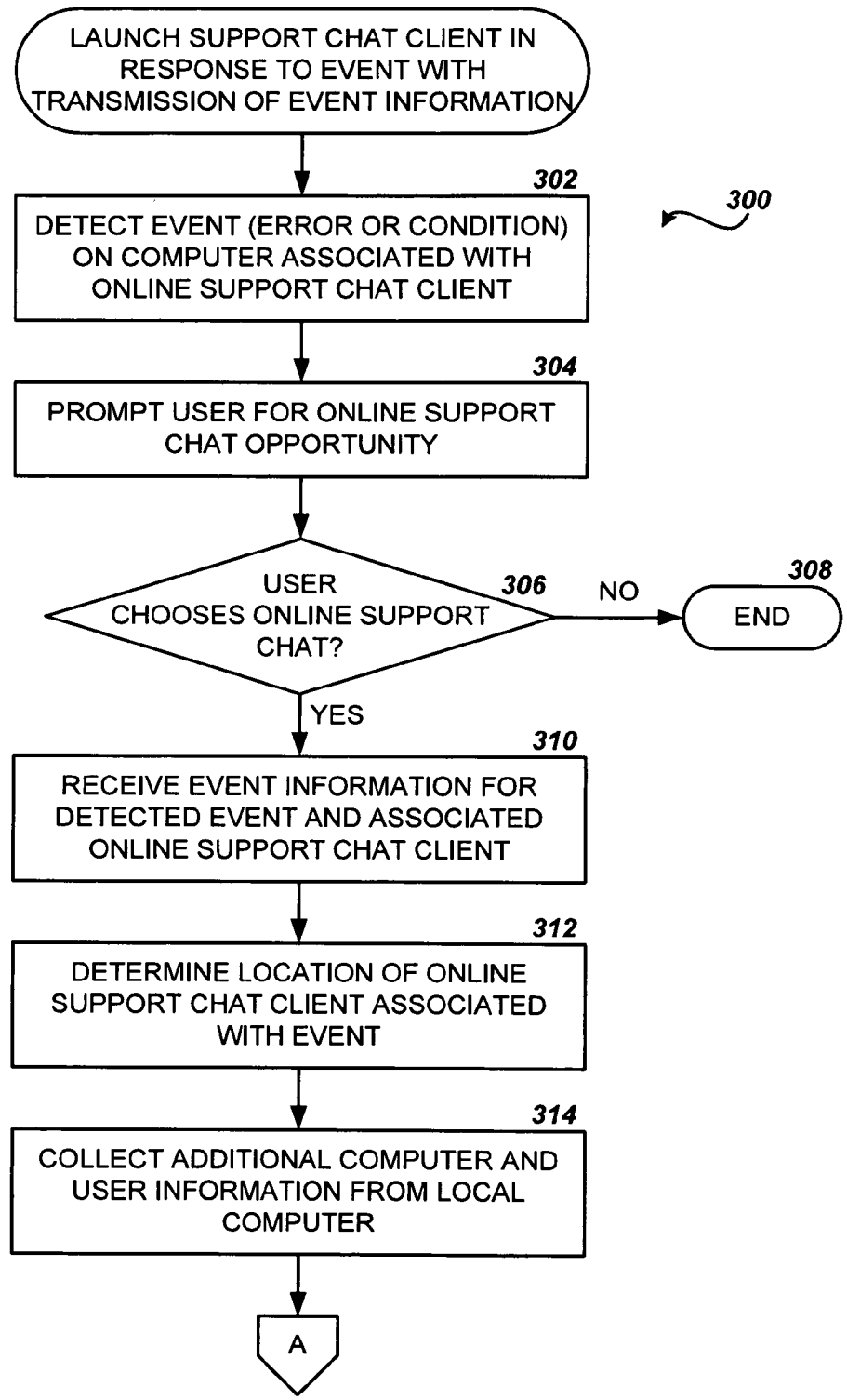
FIGS. 3A and 3B show a flow diagram showing one method for launching an online support chat session in response to an occurrence of a support event on a personal computer and transmitting detailed event information via the chat session for display to support personnel, as provided in the embodiments described herein.
Figure 3B:
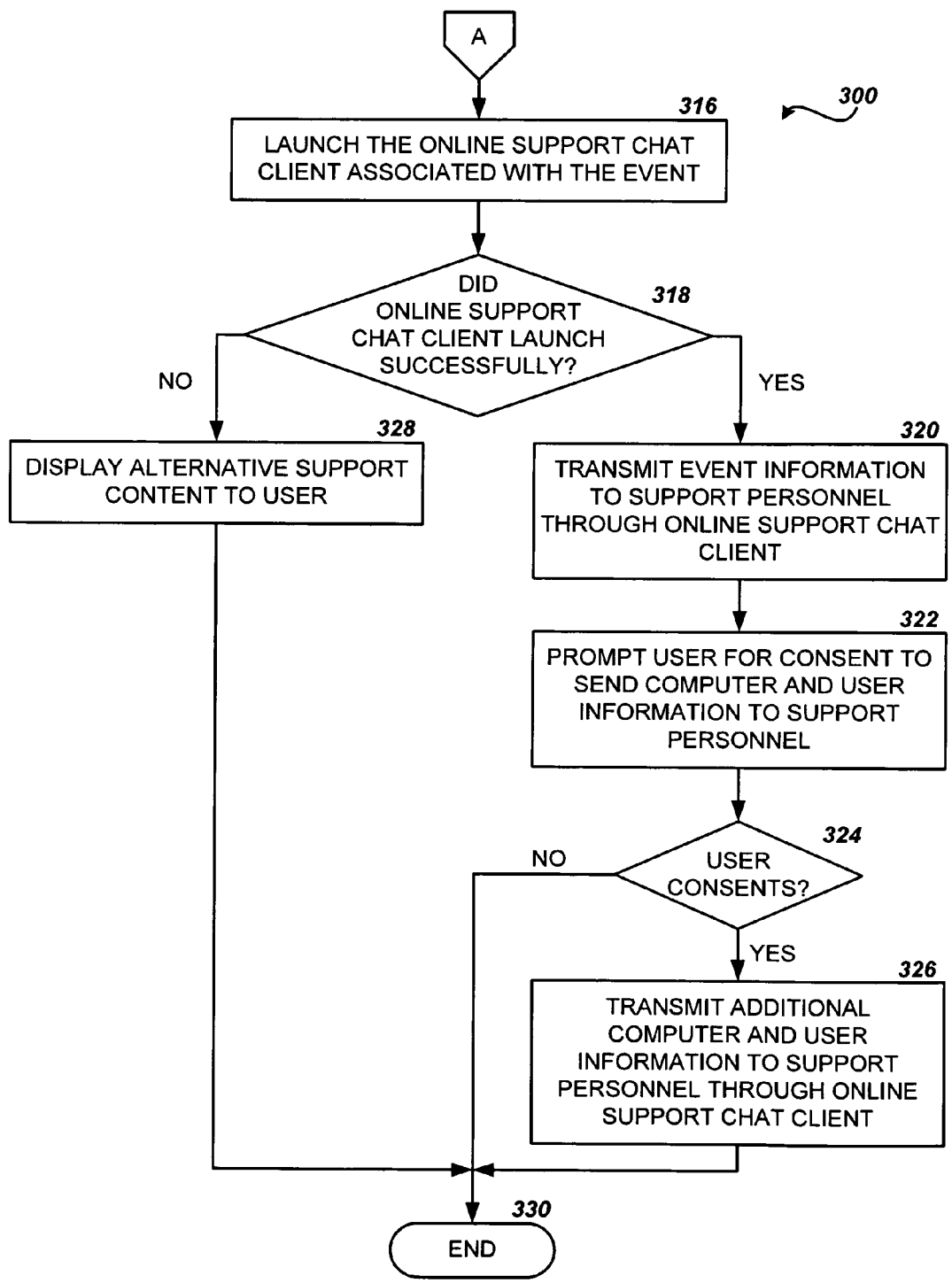

Referring now to FIGS. 3A and 3B, additional details will be provided regarding the embodiments presented herein. In particular, FIGS. 3A and 3B are a flow diagram showing one method for launching an online support chat session in response to an occurrence of a support event on a personal computer and transmitting detailed event information via the chat session for display to support personnel. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the diagnostic event monitor 108 detects the occurrence of a support event on the PC 102. As discussed above, this involves the diagnostic event monitor 108 detecting a combination of conditions defined by the trigger conditions 112 specified in an event definition 110 identifying the support event. For example, an event definition 110 may specify a trigger condition 112 of a threshold number of hardware errors being written to the system event log within a particular time period. It may also specify a support channel 114 that requires an online support chat session be established with support personnel 152 at the computer manufacturer through an online support chat client 138 installed on the PC 102. If the diagnostic event monitor 108 detects that disk errors have been written to the system log ten times in the last three days, the diagnostic event monitor 108 will trigger the support event identified by the event definition 110. This will initiate the process of establishing the online support chat session.

Upon detecting the occurrence of the support event as described above, the routine 300 proceeds from operation 302 to operation 304, where the user is prompted to determine whether the user wishes to establish the online support chat session in response to the event. In one embodiment, the diagnostic event monitor 108 prompts the user for a response by displaying the dialog box 204 that describes the details of the event and provides the user with an option 206 to establish the chat session, as illustrated in FIG. 2A. In another embodiment, the user may be prompted by the online support chat launcher 128 invoked by the diagnostic event monitor 108 upon detection of the event. It will be appreciated that any number of methods commonly known in the art may be utilized to prompt the user and solicit a response, such as displaying a small, informational pop-up window in the UI that the user may select with a mouse to establish the chat session or by flashing a selectable UI element on the display 106 of the PC 102 which is configured to invoke the online support chat launcher 128, as described above in regard to FIG. 1.

From operation 304, the routine 300 proceeds to operation 306, where the response of the user 104 is evaluated. If the user indicates that they do not wish to establish the online support chat session, the routine 300 proceeds to operation 308 where the routine 300 ends. However, if the user indicates that they do wish to establish the online support chat session, for example, by selecting the option 206 presented in the dialog box 204 as described above, then the routine 300 continues from operation 306 to operation 310.

At operation 310, the online support chat launcher 128 receives the event information 118 from the diagnostic event monitor 108, and extracts the support channel 114 that designates the online support chat session that is to be established. In one embodiment, the support channel 114 is associated with both an online support chat client 138 installed on the PC 102 and an address of a specific target support provider. Multiple event definitions 110 may be configured for the PC 102 that specify different support channels 114 associated with the same online support chat client 138 but different target support providers. This allows for an online support chat session established in response to the event to connect the user 104 with the support personnel 152 best suited to provide support based on the context of the individual condition or event that occurred.

The routine 300 proceeds from operation 310 to operation 312, where the online support chat launcher 128 determines the location of the online support chat client 138 executable which is to be launched from for the associated support channel 114. In one embodiment, the location of the online support chat client 138 executable file is stored in registry 130 on the PC 102. Support data entries 132 are placed in the registry for each online support chat client 138 installed on the PC 102 or for each support channel 114 configured in the event definitions 110. The support data entries 132 provide the file location 134 of the associated online support chat client 138 as well as a consent flag 136, which will be described in more detail below. The support data entry 132 for a specific online support chat client 138 may be added to the registry 130 when the online support chat client 138 is installed along with the configuration of the associated event definitions 110. It will be appreciated than many other mechanisms known in the art may be utilized to store the location of the executable file of the online support chat client 138 than those described above.

From operation 312, the routine 300 then proceeds to operation 314, where the online support chat launcher 128 collects the additional data 122, 124, 126 that will be transmitted along with the event information to be displayed to support personnel 152 upon establishment of the online support chat session. As described above, the additional data may consist of hardware and software configuration information 122 for the PC 102. This includes, but is not limited to, the version of the operating system (OS) installed, OS configuration settings, the amount of memory installed, the amount of total hard drive space installed, the types and versions of installed applications, a list of installed devices, and the versions of various device drivers for the installed devices, according to one embodiment. It will be appreciated that any number of hardware and software configuration settings and values may be included to help support personnel 152 quickly diagnose and solve the error or condition which gave rise to the event.

The additional data may also include user information 124, such as the name and contact information of the user 104, and support account information 126 that contains details of any support subscriptions or accounts that may have been established by the user 104 for the PC 102, according to further embodiments. In one embodiment, the additional data is collected upon installation of the online support chat launcher 128 on the PC 102 and may be updated from time to time as the information regarding the PC 102 or user 104 changes. This allows the relatively static additional data to be readily available for transmission and display to support personnel 152 when an online support chat client 138 is launched. In another embodiment, support account information 126 may exist for each online support chat client 138 installed on the PC 102. This information may be stored on the PC 102 when the associated online support chat client 138 was installed, or downloaded to the PC 102 in a previous online support chat session established through the online support chat client 138. For example, a mail-order computer manufacturer may install an online support chat client 138 on each computer constructed to provide support for the hardware, and may configure the support account information 126 for the individual purchaser before shipping the computer.

Next, the routine 300 proceeds from operation 314 to operation 316, where the online support chat launcher 128 launches the online support chat client 138, as illustrated in FIG. 3B. In one embodiment, the online support chat launcher 128 launches the chat client 138 by executing the file at the file location 134 retrieved from the registry 130 in operation 312. The online support chat launcher 128 may pass the support channel 114 information regarding the target support provider to the online support chat client 138 as a parameter on the command line. This allows the chat client 138 to establish the online support chat session immediately upon loading.

From operation 316, the routine 300 proceeds to operation 318, where the online support chat launcher 128 determines whether the online support chat client 138 started successfully and the online support chat session was established. According to one embodiment, if the chat client 138 did not start successfully or the chat session could not be established, then the routine proceeds to operation 328, where the online support chat launcher 128 displays alternative content 116 provided in the event information 118, as discussed above in regard to FIG. 2C.

If the online support chat client 138 was started successfully, then the routine 300 proceeds from operation 318 to operation 320, where the online support chat launcher 128 causes the event information 118 containing the event description 120 to be transmitted over the established online support chat session for display to the support personnel 152. In one embodiment, the online support chat client 138 may transmit the event information 118 upon execution by the online support chat launcher 128 by accepting an additional command line parameter that specifies an XML file containing the event information 118. In a further embodiment, the online support chat launcher 128 may use an API provided by the online support chat client 138 to transmit the event information 118 over the established session. Once transmitted, the event information will be displayed to the support personnel 152 providing the details of the error or other condition that triggered the event without requiring the user 104 to relate the information over the chat session.

The routine 300 then proceeds from operation 320 to operation 322, where the user 104 is prompted for consent to transmit the additional data regarding the computer 102 and the user 104 to the support personnel 152, according to one embodiment. This may be necessary since the additional data 122, 124, 126 may contain personally identifiable or private information that the user 104 may not wish to expose. In a further embodiment, the user 104 is only prompted for consent to transmit the additional data 122, 124, 126 the first time an online support chat session is established to a specific support provider. The response of the user 104 to the consent prompt is stored in the registry 130 by means of the consent flag 136 of the support data entry 132 associated with the online support chat client 138 or support channel 114. In subsequent support chat requests for the same support channel 114, the user's previous consent response will be read from the consent flag 136 without the need to display a prompt.

From operation 322, the routine 300 proceeds to operation 324, where the consent response of the user 104 is evaluated. If the user 104 does not consent to the additional data 122, 124, 126 being transmitted to support personnel 152, the routine 300 proceeds to operation 330 where the routine 300 ends. However, if the user does consent to the transmission of the additional data 122, 124, 126, then the routine proceeds to operation 326, where the additional data 122, 124, 126 regarding the computer 102 and the user 104 is transmitted via the online support chat session for display to support personnel 152. This information provides the support personnel 152 with additional context information that will allow them to address the error or condition which gave rise to the event quickly and efficiently, without such information having to be related by the user 104. In one embodiment, the transmission of the additional data 122, 124, 126 is accomplished by the same mechanism discussed above in regard to operation 320.

Figure 4:
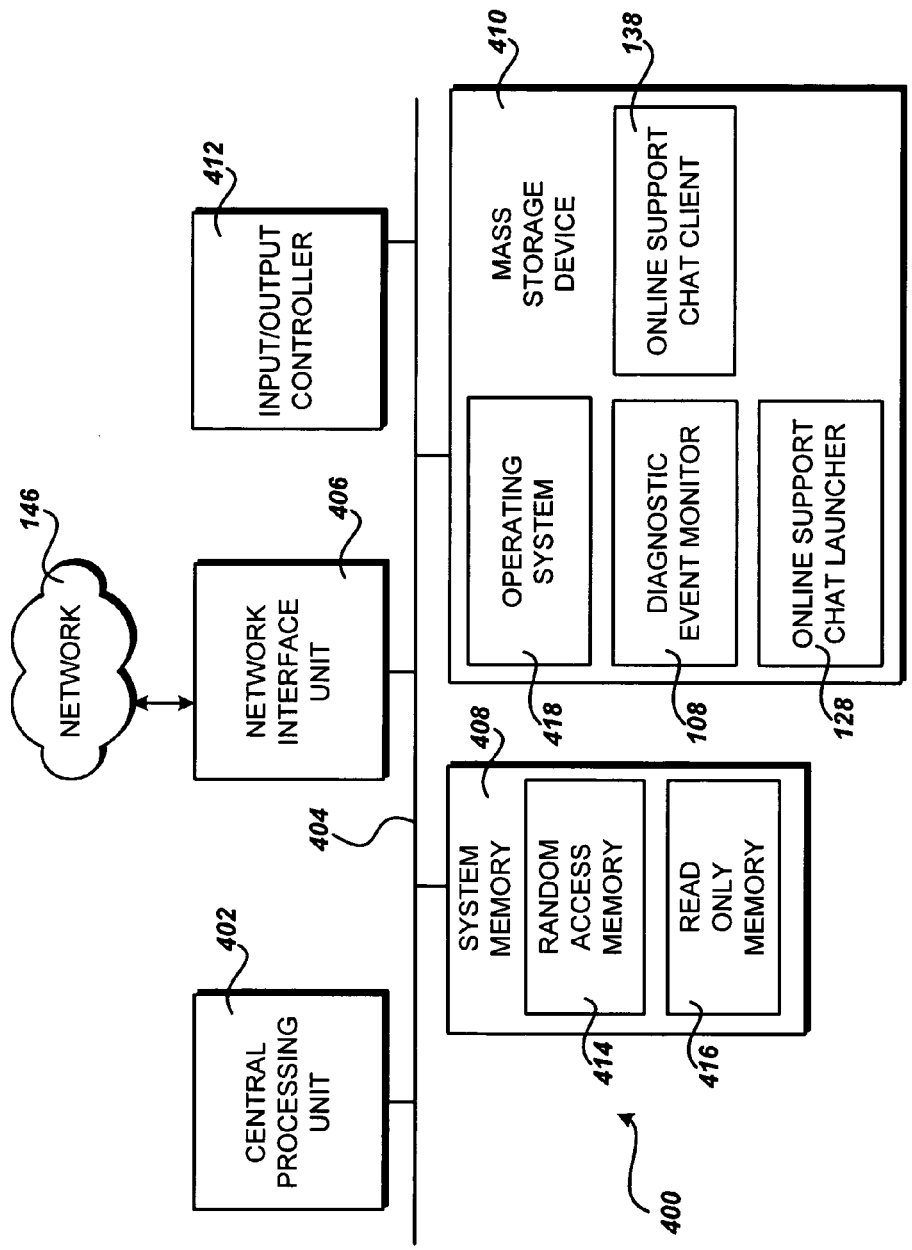
FIG. 4 is a block diagram showing an illustrative computer hardware and software architecture for a computing system capable of implementing aspects of the embodiments presented herein.

FIG. 4 shows an illustrative computer architecture for a computer 400 capable of executing the software components described herein for launching an online support chat session in response to an occurrence of a support event on a personal computer and transmitting detailed event information via the chat session for display to support personnel in the manner presented above. The computer architecture shown in FIG. 4 illustrates a conventional desktop, laptop, or server computer and may be utilized to execute any aspects of the software components presented herein described as executing on the personal computer 102, support provider's server 140, or support workstation 148.

The computer architecture shown in FIG. 4 includes a central processing unit 402 (CPU), a system memory 408, including a random access memory 414 (RAM) and a read-only memory 416 (ROM), and a system bus 404 that couples the memory to the CPU 402. A basic input/output system containing the basic routines that help to transfer information between elements within the computer 400, such as during startup, is stored in the ROM 416. The computer 400 also includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 400.

According to various embodiments, the computer 400 may operate in a networked environment using logical connections to remote computers through a network such as the network 146. The computer 400 may connect to the network 146 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. For example, the mass storage device 410 and the RAM 414 of the personal computer 102 may store the diagnostic event monitor 108, online support chat launcher 128, and online support chat client 138, each of which was described in detail above with respect to FIG. 1. In a further example, the mass storage device 410 and the RAM 414 of the support provider's server 140 illustrated in FIG. 1 may store the online support chat server 144. The mass storage device 410 and the RAM 414 may also store other types of program modules or data.

Based on the foregoing, it should be appreciated that technologies for launching an online support chat session in response to an occurrence of a support event on a personal computer and transmitting detailed event information via the chat session for display to support personnel are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for responding to a support event on a computer by establishing an online support chat session, the method comprising:
storing a plurality of event definitions on the computer, each event definition corresponding to a particular support event, where each event definition comprises,
a corresponding combination of trigger conditions on the computer including at least one of a hardware error, a software error or a condition for which a user may need technical support,
a corresponding designation of a target support provider based upon a context of the support event that occurs,
a corresponding identifier of an online support chat client that will be utilized to establish the online support chat session with support personnel associated with the corresponding designated target support provider, and
corresponding alternative content regarding the support event,
at least two different event definitions of the plurality of event definitions stored on the computer include respective different corresponding combinations of trigger conditions, different corresponding designations of target support providers, different corresponding identifiers of online support chat clients and different corresponding alternative content;
upon the detection of a first combination of trigger conditions satisfying a first of the at least two different event definitions, collecting data regarding the computer and a user of the computer, and attempting to establish a first online support chat session with first support personnel of a first designated target support provider by executing a first online support chat client associated with a first support event;
upon the detection of a second combination of trigger conditions satisfying a second of the at least two different event definitions, collecting data regarding the computer and the user of the computer, and attempting to establish a second online support chat session with second support personnel associated of a second designated target support provider by executing a second online support chat client associated with a second support event;
determining if the first or second online support chat session was properly established and if properly established, causing event information and the data regarding the computer and the user to be transmitted to the first or second support system respectively for display to the respective first or second support personnel associated with the respective first or second designated target support provider via the respective first or second online support chat client; and determining if the first or second online support chat session was not properly established, and if not properly established, displaying first or second different corresponding alternative content respectively associated with the first and second of the at least two different event definitions regarding the respective first or second support event to the user of the computer.

2. The method of claim 1 further comprising:
upon detecting the combination of trigger conditions, determining whether the user wishes to establish the online support chat session in response to the support event; and
establishing the online support chat session only in response to determining that the user wishes to establish the online support chat session.

3. The method of claim 1, wherein the data regarding the computer and the user comprises one or more of information identifying a hardware and software configuration of the computer, information identifying the user, and information identifying a support account for the user and the computer.

4. The method of claim 1, wherein collecting the data regarding the computer and the user comprises retrieving information regarding the computer and the user previously collected and stored in a non-volatile storage of the computer.

5. The method of claim 1, wherein causing the event information and the data regarding the computer and the user to be transmitted to the first or second support system comprises:
upon establishing the first or second online support chat session, determining whether the user consents to transmission of the data regarding the computer and the user;
causing the event information and the data regarding the computer and the user to be transmitted to the first or second support system via the corresponding first or second online support chat client in response to determining that the user consents to transmission of the data regarding the computer and the user; and
causing only the event information to be transmitted to the first or second support system via the corresponding first or second online support chat client in response to determining that the user does not consent to transmission of the data regarding the computer and the user.

6. The method of claim 5, wherein determining whether the user consents to transmission of the data regarding the computer and the user is not performed upon a subsequent occurrence of launching the first or second online support chat client for the user on the computer.

7. A magnetic storage device, a solid state storage device, or an optical disk having computer executable instructions stored thereon that, when executed by a computer, cause the computer to:
storing a plurality of event definitions on the computer, each event definition corresponding to a particular support event, where each event definition comprises,
a corresponding combination of trigger conditions on the computer including at least one of a hardware error, a software error or a condition for which a user may need technical support,
a corresponding designation of a target support provider being based upon a context of the support event that occurs,
a corresponding identifier of an online support chat client that will be utilized to establish the online support chat session with support personnel associated with the corresponding designated target support provider, and
corresponding alternative content regarding the support event,
at least two different event definitions of the plurality of event definitions stored on the computer include respective different corresponding combinations of trigger conditions, different corresponding designations of target support providers, different corresponding identifiers of online support chat clients and different corresponding alternative content;
upon the detection of a first combination of trigger conditions satisfying a first of the at least two different event definitions, determine a first location of a first identified online support chat client, collect data regarding the computer and user, and attempt to launch the first identified online support chat client with first support personnel of a first designated target support provider;
upon the detection of a second combination of trigger conditions satisfying a second of the at least two different event definitions, determine a second location of a second identified online support chat client, collect data regarding the computer and user, and attempt to launch the second identified online support chat client with second support personnel of a second designated target support provider;
determine if the first or second identified online support chat client launched successfully, and if the identified online support chat client launched successfully, transmit event information and the data regarding the computer and the user to the respective first or second support personnel associated with the respective first or second designated target support provider via the respective first or second online support chat client; and
determine if the first or second identified online support chat client did not launch successfully, and if not launched successfully, display first or second different corresponding alternative content respectively associated with the first and second of the at least two different event definitions regarding the respective first or second support event to a user of the computer.

8. The magnetic storage device, solid state storage device, or optical disk of claim 7, wherein the data regarding the computer and the user comprises one or more of information identifying a hardware and software configuration of the computer, information identifying the user, and information identifying a support account for the user and the computer.

9. The magnetic storage device, solid state storage device, or optical disk of claim 7, wherein collecting the data regarding the computer and the user comprises retrieving the data regarding the computer and the user previously collected and stored in a non-volatile storage of the computer.

10. The magnetic storage device, solid state storage device, or optical disk of claim 7, having further computer executable instructions stored thereon that, when executed by a computer, cause the computer to:
upon launching the identified first or second online support chat client, prompt the user for consent to transmit the data regarding the computer and the user to corresponding first or second support personnel;
if the user consents, transmit the event information and the data regarding the computer and the user to corresponding first or second support personnel via the corresponding first or second online support chat client;
if the user does not consent, transmit only the event information to corresponding first or second support personnel via the corresponding first or second online support chat client; and
storing a consent flag associated with the identified first or second online support chat client, the consent flag indicating a response of the user to the consent prompt and utilized to determine the consent of the user to transmit the data regarding the computer and the user to first or second support personnel in a subsequent launch of the associated first or second online support chat client.

11. A method for launching an online support chat client on a computer, the method comprising:

storing a plurality of event definitions on the computer, each event definition corresponding to a particular support event, where each event definition comprises,
- a corresponding combination of trigger conditions on the computer including at least one of a hardware error, a software error or a condition for which a user may need technical support,
- a corresponding designation of a target support provider based upon a context of the support event that occurs,
- a corresponding identifier of the online support chat client that will be utilized to establish the online support chat session with support personnel associated with the corresponding designated target support provider, and
- corresponding alternative content regarding the support event, at least two different event definitions of the plurality of event definitions stored on the computer include respective different corresponding combinations of trigger conditions, different corresponding designations of target support providers, different corresponding identifiers of online support chat clients and different corresponding alternative content;

upon the detection of a first combination of trigger conditions satisfying a first of the at least two different event definitions, retrieving a first file name of a first online support chat client to launch and retrieving data regarding the computer and a user of the computer;

upon retrieving the data regarding the computer and the user, displaying a prompt asking whether the user consents to the data regarding the computer and the user being transmitted to support personnel;

receiving a response to the prompt;

upon receiving the response, attempting to execute the first online support chat client to establish the first online support chat session with first support personnel associated with a first designated target support provider, and passing the support event information, the data regarding the computer and the user, and a consent flag indicating the response to the prompt to the first online support chat client;

storing the consent flag associated with the first online support chat client, the consent flag utilized to determine the consent of the user to transmit the data regarding the computer and the user to the first support personnel in a subsequent launch of the first online support chat client;

upon the detection of a second combination of trigger conditions satisfying a second of the at least two different event definitions, collecting data regarding the computer and the user of the computer, and attempting to establish a second online support chat session with second support personnel associated of a second designated target support provider by executing a second online support chat client associated with a second support event;

determining if the first or second online support chat client launched successfully; and determining if the first or second online support chat client did not launch successfully, and if not launched successfully, displaying first or second different corresponding alternative content respectively associated with the first and second of the at least two different event definitions regarding the respective first or second support event to the user of the computer.

12. The method of claim 11, wherein the data regarding the computer and the user comprises one or more of information identifying a hardware and software configuration of the computer, information identifying a user of the computer, and information identifying a support account for the user and the computer.

13. The method of claim 12, wherein retrieving the data regarding the computer and the user comprises retrieving information regarding the computer, the user, and the support account previously collected and stored in a non-volatile storage of the computer.

* * * * *